United States Patent
Hartmann et al.

(10) Patent No.: US 9,993,975 B2
(45) Date of Patent: Jun. 12, 2018

(54) DEVICE FOR PRODUCING THREE-DIMENSIONAL MODELS

(71) Applicant: VOXELJET AG, Friedberg (DE)

(72) Inventors: Andreas Dominik Hartmann, Stadtbergen (DE); Ingo Ederer, Geltendorf (DE)

(73) Assignee: VOXELJET AG, Friedberg (DE)

( * ) Notice: Subject to any disclaimer, the term of this patent is extended or adjusted under 35 U.S.C. 154(b) by 209 days.

(21) Appl. No.: 14/855,722

(22) Filed: Sep. 16, 2015

(65) Prior Publication Data

US 2016/0001507 A1 Jan. 7, 2016

Related U.S. Application Data

(63) Continuation of application No. 13/583,989, filed as application No. PCT/DE2011/000341 on Mar. 28, 2011, now Pat. No. 9,174,391.

(30) Foreign Application Priority Data

Mar. 31, 2010 (DE) ........................ 10 2010 013 733

(51) Int. Cl.
*B29C 64/153* (2017.01)
*B29C 67/00* (2017.01)
*B33Y 30/00* (2015.01)

(52) U.S. Cl.
CPC ........ *B29C 67/0085* (2013.01); *B29C 64/153* (2017.08); *B29C 67/0077* (2013.01); *B29C 67/0081* (2013.01); *B33Y 30/00* (2014.12)

(58) Field of Classification Search
CPC ..... B29C 64/20; B29C 64/153; B29C 64/165; B29C 67/00; B33Y 30/00
(Continued)

(56) References Cited

U.S. PATENT DOCUMENTS 4,381,839 A * 5/1983 Engler .................... B66C 19/02
 212/314
4,575,330 A 3/1986 Hull
(Continued)

FOREIGN PATENT DOCUMENTS

AU 720255 B2 5/2000
DE 4300478 8/1994
(Continued)

OTHER PUBLICATIONS

US 4,937,420, 06/1990, Deckard (withdrawn)
(Continued)

*Primary Examiner* — Matthew J Daniels
*Assistant Examiner* — Leith S Shafi
(74) *Attorney, Agent, or Firm* — The Dobrusin Law Firm, P.C.

(57) ABSTRACT

The present invention relates to a device for manufacturing three-dimensional models by means of a 3D printing process, whereby a build platform for application of build material is provided and a support frame is arranged around the build platform, to which said support frame at least one device for dosing the particulate material and one device for bonding the particulate material is attached via the guiding elements and the support frame is moveable in a Z direction, which essentially means perpendicular to the base surface of the build platform, said movement provided by at least two vertical positioning units on the support frame. In this respect, it is provided that the positioning units are respectively separate components and are arrangeable on the support frame independently from one another and the location and orientation of such can be adjusted independently from one another.

21 Claims, 6 Drawing Sheets

Figure 1A:
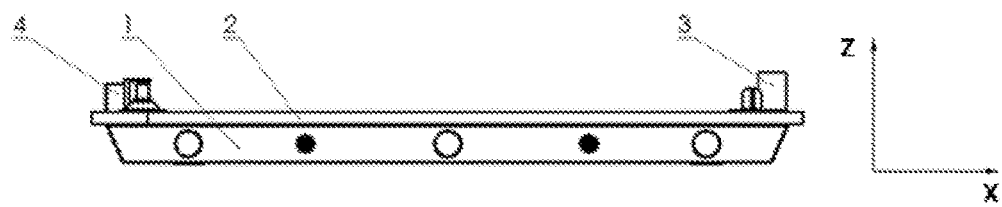

(58) Field of Classification Search
USPC .................................................. 425/174, 385
See application file for complete search history.

(56) References Cited

U.S. PATENT DOCUMENTS

| | | | |
|---|---|---|---|
| 4,665,492 A | 5/1987 | Masters | |
| 4,752,352 A | 6/1988 | Feygin | |
| 4,863,538 A | 8/1989 | Deckard | |
| 4,938,816 A | 7/1990 | Beaman et al. | |
| 4,944,817 A | 7/1990 | Bourell et al. | |
| 4,972,924 A * | 11/1990 | Nielsen | E04G 21/32 182/152 |
| 5,017,753 A | 5/1991 | Deckard | |
| 5,053,090 A | 10/1991 | Beaman et al. | |
| 5,059,266 A | 10/1991 | Yamane et al. | |
| 5,076,869 A | 12/1991 | Bourell et al. | |
| 5,127,037 A | 6/1992 | Bynum | |
| 5,132,143 A | 7/1992 | Deckard | |
| 5,134,569 A | 7/1992 | Masters | |
| 5,136,515 A | 8/1992 | Helinski | |
| 5,140,937 A | 8/1992 | Yamane et al. | |
| 5,147,587 A | 9/1992 | Marcus et al. | |
| 5,149,548 A | 9/1992 | Yamane et al. | |
| 5,155,324 A | 10/1992 | Deckard et al. | |
| 5,156,697 A | 10/1992 | Bourell et al. | |
| 5,182,170 A | 1/1993 | Marcus et al. | |
| 5,204,055 A | 4/1993 | Sachs et al. | |
| 5,216,616 A | 6/1993 | Masters | |
| 5,248,456 A | 8/1993 | Evans, Jr. et al. | |
| 5,252,264 A | 10/1993 | Forderhase et al. | |
| 5,284,695 A | 2/1994 | Barlow et al. | |
| 5,296,062 A | 3/1994 | Bourell et al. | |
| 5,316,580 A | 5/1994 | Deckard | |
| 5,340,656 A | 8/1994 | Sachs et al. | |
| 5,342,919 A | 8/1994 | Dickens, Jr. et al. | |
| 5,352,405 A | 10/1994 | Beaman et al. | |
| 5,354,414 A | 10/1994 | Feygin | |
| 5,382,308 A | 1/1995 | Bourell et al. | |
| 5,387,380 A | 2/1995 | Cima et al. | |
| 5,431,967 A | 7/1995 | Manthiram et al. | |
| 5,482,659 A | 1/1996 | Sauerhoefer | |
| 5,490,962 A | 2/1996 | Cima et al. | |
| 5,506,607 A | 4/1996 | Sanders, Jr. et al. | |
| 5,555,176 A | 9/1996 | Menhennett et al. | |
| 5,573,055 A | 11/1996 | Melling et al. | |
| 5,582,231 A | 12/1996 | Siak et al. | |
| 5,597,589 A | 1/1997 | Deckard | |
| 5,616,294 A | 4/1997 | Deckard | |
| 5,639,070 A | 6/1997 | Deckard | |
| 5,639,402 A | 6/1997 | Barlow et al. | |
| 5,647,931 A | 6/1997 | Retallick et al. | |
| 5,658,412 A | 8/1997 | Retallick et al. | |
| 5,730,925 A | 3/1998 | Mattes et al. | |
| 5,740,051 A | 4/1998 | Sanders, Jr. et al. | |
| 5,753,274 A | 5/1998 | Wilkening et al. | |
| 5,807,437 A | 9/1998 | Sachs et al. | |
| 5,851,465 A | 12/1998 | Bredt | |
| 5,902,441 A | 5/1999 | Bredt et al. | |
| 5,902,537 A | 5/1999 | Almquist et al. | |
| 5,943,235 A | 8/1999 | Earl et al. | |
| 6,007,318 A | 12/1999 | Russell et al. | |
| 6,036,777 A | 3/2000 | Sachs | |
| 6,042,774 A | 3/2000 | Wilkening et al. | |
| 6,048,188 A | 4/2000 | Hull et al. | |
| 6,116,517 A | 8/2000 | Heinzl et al. | |
| 6,133,353 A | 10/2000 | Bui et al. | |
| 6,146,567 A | 11/2000 | Sachs et al. | |
| 6,147,138 A | 11/2000 | Hochsmann et al. | |
| 6,155,331 A | 12/2000 | Langer et al. | |
| 6,165,406 A | 12/2000 | Jang et al. | |
| 6,193,922 B1 | 2/2001 | Ederer | |
| 6,217,816 B1 | 4/2001 | Tang | |
| 6,259,962 B1 | 7/2001 | Gothait | |
| 6,305,769 B1 | 10/2001 | Thayer et al. | |
| 6,322,728 B1 | 12/2001 | Brodkin et al. | |
| 6,355,196 B1 | 3/2002 | Kotnis et al. | |
| 6,375,874 B1 | 4/2002 | Russell et al. | |
| 6,395,811 B1 | 5/2002 | Nguyen et al. | |
| 6,401,001 B1 | 6/2002 | Jang et al. | |
| 6,403,002 B1 | 6/2002 | Van Der Geest | |
| 6,416,850 B1 | 7/2002 | Bredt et al. | |
| 6,423,255 B1 | 7/2002 | Hoechsmann et al. | |
| 6,436,334 B1 | 8/2002 | Hattori et al. | |
| 6,464,208 B1 | 10/2002 | Smith | |
| 6,467,525 B2 | 10/2002 | Herreid et al. | |
| 6,476,122 B1 | 11/2002 | Leyden | |
| 6,500,378 B1 | 12/2002 | Smith | |
| 6,554,600 B1 | 4/2003 | Hofmann et al. | |
| 6,610,429 B2 | 8/2003 | Bredt et al. | |
| 6,682,030 B2 | 1/2004 | Santoro et al. | |
| 6,722,872 B1 | 4/2004 | Swanson et al. | |
| 6,733,528 B2 | 5/2004 | Abe et al. | |
| 6,764,636 B1 | 7/2004 | Allanic et al. | |
| 6,838,035 B1 | 1/2005 | Ederer et al. | |
| 7,004,222 B2 | 2/2006 | Ederer et al. | |
| 7,049,363 B2 | 5/2006 | Shen | |
| 7,137,431 B2 | 11/2006 | Ederer et al. | |
| 7,290,348 B2 | 11/2007 | Katamachi | |
| 7,387,359 B2 | 6/2008 | Hernandez et al. | |
| 7,497,977 B2 | 3/2009 | Nielsen et al. | |
| 7,597,835 B2 | 10/2009 | Marsac | |
| 7,641,461 B2 | 1/2010 | Khoshnevis | |
| 7,753,642 B2 * | 7/2010 | Bosscher | B25J 17/0266 414/735 |
| 8,337,736 B2 * | 12/2012 | Dini | B28B 1/001 264/113 |
| 9,174,391 B2 * | 11/2015 | Hartmann | B29C 67/0077 |
| 2001/0050031 A1 | 12/2001 | Bredt et al. | |
| 2002/0026982 A1 | 3/2002 | Bredt et al. | |
| 2002/0111707 A1 | 8/2002 | Li et al. | |
| 2003/0028278 A1 | 2/2003 | Darrah et al. | |
| 2003/0083771 A1 | 5/2003 | Schmidt | |
| 2004/0003738 A1 * | 1/2004 | Imiolek | B22F 3/1055 101/480 |
| 2004/0012112 A1 | 1/2004 | Davidson et al. | |
| 2004/0035542 A1 | 2/2004 | Ederer et al. | |
| 2004/0038009 A1 | 2/2004 | Noel et al. | |
| 2004/0045941 A1 | 3/2004 | Herzog et al. | |
| 2004/0056378 A1 | 3/2004 | Bredt et al. | |
| 2004/0094058 A1 | 5/2004 | Kasperchik et al. | |
| 2004/0104515 A1 | 6/2004 | Swanson et al. | |
| 2004/0145088 A1 | 7/2004 | Patel et al. | |
| 2005/0017394 A1 | 1/2005 | Hochsmann et al. | |
| 2005/0093194 A1 | 5/2005 | Christopher et al. | |
| 2005/0167872 A1 | 8/2005 | Tsubaki et al. | |
| 2005/0174407 A1 | 8/2005 | Johnson et al. | |
| 2005/0194401 A1 * | 9/2005 | Khoshnevis | B29C 64/106 222/100 |
| 2005/0280185 A1 | 12/2005 | Russell et al. | |
| 2007/0181519 A1 * | 8/2007 | Khoshnevis | B66C 5/00 212/180 |
| 2008/0001331 A1 | 1/2008 | Ederer | |
| 2008/0148683 A1 * | 6/2008 | Dini | B28B 1/001 52/741.1 |
| 2010/0152865 A1 | 6/2010 | Jonsson et al. | |
| 2010/0212584 A1 | 8/2010 | Ederer et al. | |
| 2010/0207288 A1 | 9/2010 | Enrico | |
| 2010/0243123 A1 | 9/2010 | Voxeljet | |
| 2013/0000549 A1 | 1/2013 | Hartmann | |

FOREIGN PATENT DOCUMENTS

| | | |
|---|---|---|
| DE | 4440397 | 9/1995 |
| DE | 19545167 A1 | 6/1997 |
| DE | 19853834 | 5/2000 |
| DE | 100 53 741 C1 | 2/2002 |
| DE | 10231136 A1 | 2/2003 |
| DE | 69634921 T2 | 12/2005 |
| DE | 102006030350 A1 | 1/2008 |
| EP | 0361847 B1 | 4/1990 |
| EP | 0431924 B1 | 1/1996 |
| EP | 0644809 B1 | 7/2001 |
| EP | 1415792 | 5/2004 |

(56) References Cited

FOREIGN PATENT DOCUMENTS

| EP | 1872928 A1 | 1/2008 |
|---|---|---|
| WO | 01/96048 A1 | 12/2001 |
| WO | 02/064353 A1 | 8/2002 |
| WO | 02/064354 A1 | 8/2002 |
| WO | 03/016030 A1 | 2/2003 |
| WO | 03/016067 A2 | 2/2003 |
| WO | 2004/010907 A1 | 2/2004 |
| WO | 2005/082603 A1 | 9/2005 |
| WO | 2005/097476 A2 | 10/2005 |
| WO | 2005/113219 A1 | 12/2005 |
| WO | 2007/039450 A1 | 4/2007 |
| WO | 2009/037550 A2 | 3/2009 |
| WO | 2011/120505 A1 | 10/2011 |

OTHER PUBLICATIONS

Nop Head. "Making Mendel". Mar. 21, 2010. HydraRaptor. <http://hydraraptor.blogspot.com/2010/03/making-mendel.html> Year: 2010).*
Cima et al., "Computer-derived Microstructures by 3D Printing: Bio- and Structural Materials," SFF Symposium, Austin, TX, 1994.
Sachs et al., "Three-Dimensional Printing: Rapid Tooling and Prototypes Directly from a CAD Model", Massachusetts Institute of Technology, pp. 131-136, 1990.
Sachs et al., "Three-Dimensional Printing: Rapid Tooling and Prototypes Directly from a CAD Model", Massachusetts Institute of Technology, pp. 143 & 151, Jan. 1990.
Jacobs et al., 2005 SME Technical Paper, title "Are QuickCast Patterns Suitable for Limited Production?".
Feature Article—Rapid Tooling—Cast Resin and Sprayed Metal Tooling by Joel Segal, Apr. 2000.
Williams, "Feasibility Study of Investment Casting Pattern Design by Means of Three Dimensional Printing", Department of Mechanical Engineering, pp. 2-15, Jun. 1987.
Gephart, Rapid Prototyping, pp. 118-119, 1996.
Marcus et al., Solid Freeform Fabrication Proceedings, Nov. 1993.
Marcus, et al., Solid Freeform Fabrication Proceedings, Sep. 1995, p. 130-33.
Related Application, U.S. Appl. No. 12/681,957, filed Apr. 7, 2010, published as 2010/0212584.
Related Application, U.S. Appl. No. 13/634,099, filed Sep. 11, 2012, published as 2013/0000549.
International Search Report, Application No. PCT/DE2011/000341, dated, Feb. 8, 2011, Publishes as WO2011/120505A1.
International Preliminary Report on Patentability, Application No. PCT/DE2011/000341, dated Oct. 2, 2012.
Office Action from the EP Patent Office dated Sep. 4, 2013 for EP2552674.
Exhibit A. (Annotated Fig. 1 of USP 646208).
Exhibit B. (Annotated Fig. 24 of USP 7641461).

* cited by examiner

DEVICE FOR PRODUCING THREE-DIMENSIONAL MODELS

The invention relates to a device for manufacturing three-dimensional models by a 3D printing method as expressed in the generic concept of patent claim 1.

A method for producing three-dimensional objects from computer data is described in the European patent specification EP 0 431 924 B1. In this method, a particulate material is deposited in a thin layer onto a platform which, if needed, is surrounded by a chamber and then a binder material is selectively printed according to computer data on the particulate material using a print head. The particle area onto which the binder is printed sticks together and solidifies under the influence of the binder and, if necessary, an additional hardener. The platform is then lowered by a distance of one layer thickness into a build cylinder and provided with a new layer of particulate material, which is also printed as described above. These steps are repeated until a certain, desired height of the object is achieved. A three-dimensional object is thereby produced from the printed and solidified areas.

The object produced from the solidified particulate material as described above is embedded in loose particulate material and such is subsequently removed therefrom. This is done, for example, using an extractor. This leaves the desired objects, from which the remaining powder is removed, e.g. by brushing.

Other powder-supported rapid prototyping processes work in a similar manner, for example, selective laser sintering or electron beam sintering, in which a loose particulate material is also deposited in layers and selectively solidified with the aid of a controlled physical radiation source.

All these methods are referred to collectively below as "three-dimensional printing methods" or "3D printing methods".

However, the provision of a build container with the vertically lowerable build platform located within requires a high technical effort in respects to sealing of the chamber wall against the platform to prevent the particulate material from uncontrollably flowing out through the gap between the edge of the build platform and the chamber wall, otherwise the danger exists that the platform will jam against the chamber wall due to the possibly grainy particulate material.

Another disadvantage of the lowerable build platform is the constantly increasing weight on the build platform to be moved as the building process progresses. In particular during application of the new layer, it may be necessary to lower the powder bed by more than the layer thickness and then raise it again to the dimension required in order to adjust the layer thickness with sufficient accuracy. In the case of such a revolving operation, not only the total weight of the powder feedstock including the build platform must be overcome, but also the frictional forces of the powder bed relating to the chamber walls and the seal friction between the build platform and chamber wall. This results in high loads for the guides and drives, especially when dealing with large build spaces and high feedstock thicknesses of the particulate material employed.

In this regards it is known from the prior art of EP 0 644 809 B1 and DE 10 2006 030 350 A1 of a method whereby the particle bed is not lowered relatively to the worktable, but rather the coating apparatus and the print head used for applying the particulate material and binder are raised relative to the particle bed.

Thus it is known from the prior art that a coater for particulate material and a print head are attached to a support frame and thereupon arranged. The guiding elements are thereby integrally designed in total, for example, by connection with one another via a base plate. In particular, this is done to achieve good distribution of force.

Furthermore, as is known from the prior art, four Z axes are provided and all Z axes are connected with one another via connecting rods on the upper side and connecting rods on the underside. The manufacturing accuracy of the dimensions required for such sizes is very imprecise and therefore the system is absolutely statically over-defined. At the same time, it is expensive and difficult to install.

Since such designs normally require welded constructions, a Z axle structure must be adapted for almost all sides. Since the accuracy requirements are, however, quite high, such a welded construction is very expensive and very difficult to get.

According to the present invention, an object of the device relates to enabling the previously mentioned art to obtain exact Z axis movement of both the coater of particulate material and the print head that is simple to install and adjust.

This object is achieved by a device according to patent claim 1.

According to the present invention, a device for manufacturing three-dimensional models by means of a 3D printing process is described, whereby a build platform for application of build material is provided and a support frame is arranged around the build platform, to which said support frame at least one device for dosing the particulate material and one device for bonding the particulate material are attached via the guiding elements, and the support frame is moveable in a Z direction, which essentially means perpendicular to the base surface of the build platform.

According to the present invention, the positioning units are respectively separate components and are arrangeable on the support frame independently from one another and the location and orientation of such can be adjusted independently from one another.

According to a preferred embodiment of the present invention, a print head for dosing liquid droplets is suggested as a device for bonding particulate material. When brought in contact with the particulate material, this liquid leads to locally confined bonding. However, there are also other devices for bonding that could be employed, such as systems for the creation of high energy beams, for example lasers, that in turn lead to locally confined bonding of the particulate material at the point of impingement.

Preferentially the support frame displays an essentially rectangular shape when viewed from a top view. This may be advantageous due to the fact that 3D printing systems with linearly arrayed print heads obtain a higher surface print speed if the surface to be printed is rectangularly shaped and the print head prints across the long side. Moreover, as the width increases, the difficulty to manually remove unbonded particulate material from the structural body also increases. Therefore, with this in mind, we also recommend limiting the width to a manageable size. An area of 1 to 2 m can be named as a practical size. In such a case, the loose particulate material can be manually removed with simple cleaning aids. Larger dimensions are feasible, but they require more elaborate aids, such as walkable bridges or machine-assisted cleaning systems.

The suspension points of the support frame to the positioning units are hereby preferentially arranged at points other than the corners. In the case of larger dimensioning of the support frame, it may prove advantageous to provide additional suspension points.

It has been shown that a high rigidity and stability against vibration can be achieved by suspending the support frame via two suspension points arranged on each of the two long sides of the rectangular support frame.

In so doing, the positioning units preferentially can be adjusted independently from one another in terms of location and orientation and, yet more preferentially, each positioning unit engages with the support frame at a suspension point and is independently moveable in the Z direction.

Furthermore, it may prove advantageous if at least two vertical positioning units are connected via a supporting structure. In so doing, the supporting structure may also be flexibly deformable.

In so doing, it may be provided that every supporting structure and/or every vertical positioning unit has at least three vertically adjustable feet.

The device can be such that, for example, it is constructed without a separate foundation due to the fact that forces are optimally transferred to the floor. This can be accomplished by means of e.g. a fixed connection of the Z axis with the floor via machine feet that are adjustable in the X, Y and Z directions.

For this purpose, Z is the vertical direction, X is the horizontal direction of the longer side of the support frame and Y corresponds to the short side of the support frame.

According to the invention, few requirements are placed on the floor. It must be able to safely bear the weight of the machine without deforming severely. No special demands are placed on the levelness or surface quality. A concrete floor constructed to the current state of technology is adequate for the intended purpose.

According to one preferred embodiment of the present invention, the suspension points are the Bessel points of the support frame. Such an embodiment achieves the statically lowest flexing of the support frame.

In order to achieve high accuracy and high stability while maintaining low weight, the support frame is preferably formed from rectangular tube profiles made of steel. Other design shapes and materials, for instance, fibre-reinforced composites, are likewise feasible without compromising the functionality.

Preferably, as already described, every suspension point can be independently moved in the Z direction by a positioning unit.

Such a vertical positioning unit could consist of e.g. a linear thrust unit, preferentially having a linear actuator, a drive motor and a linear guide.

To ensure movement of the vertical positioning units that is as uniform as possible, the drive motors are, according to a preferred embodiment of the present invention, coupled to one another via an electronic gantry system.

According to another preferred embodiment of the present invention, every vertical positioning unit is held by its own, stand-alone axle frame. In such a way, it is possible to achieve a modular construction of the entire device. The vertical positioning units can thereby be advantageously and independently of one another exchanged without a problem.

In order to achieve high accuracy and high stability while maintaining low weight, the weight-bearing structure of every vertical positioning unit is preferably formed from light metal plates which are pinned and/or screwed. This offers the advantage that the spatial structure consists of relatively simple, flat surface planes, which can be worked with in one work step.

Material distortion due to welding or retrofitting work does not occur and therefore there is no need for extra work after the installation.

This advantage is particularly evident when dealing with larger dimensioned versions of the device and thereby leads to significant cost savings compared to welded steel constructions.

Furthermore, it is also conceivable that other materials instead of the light metal plates are used, for example, fibre-reinforced composites or sandwich plates made of fibre-reinforced composites. Instead of screw connections, it is also naturally possible that other distortion-free joining techniques, such as adhesives or rivets, are employed.

In order to absorb the process-related forces, torsional forces and vibrations, the plates are, according to another preferred embodiment of the present invention, arranged with an optimized contour and, if applicable, arranged in an appropriate direction.

In such a manner, each vertical positioning unit can be optimized in respects to weight and load.

A further advantage as compared to welded connections is that the individual plates can be easily exchanged.

Such a vertical positioning unit made of light metal in a device according to the present invention is both economical and readily available.

Another feature of the device according to the invention is the spatially static arrangement of the support frame in relation to the vertical positioning units. Especially in the case of a desired larger dimensioning of the device, it might occur that an indeterminate positioning coincides with unfavourable circumstances, e.g. temperature effect or incorrect adjustment, and such could lead to enormous forces being manifested and exerted at the bearing points, which could, in turn, result in deformation or even, in the worst case scenario, in collapse of the structure.

According to the present invention, it may furthermore prove additionally advantageous that the support frame engages with the vertical positioning units by means of bearing pins and ball-joint pivoting bearings.

Preferably, it may also be provided that engagement of the bearing pins with the ball-joint pivoting bearing is at least partially loose.

It could, for example, prove advantageous that the support frame has ball-joint pivoting bearings situated that receive the pins. On one side, the bearing pin pair is situated loosely in the pivoting bearings in the Y direction.

Two drillholes on the opposite side for the pivoting bearings could, for example, be implemented in the support frame as oblong-shaped holes in the X direction. The pivoting bearing with the pin can move in the X direction, thus resulting in a floating bearing arrangement of the support frame in the X direction.

If the frame and/or the Z axis system expands in either the X or Y direction, then the change will be absorbed by the floating bearing arrangement. If the expansions vary, then the pivoting bearings compensate for further angular misalignments.

If the individual Z axes move differently, then the design size-related large lever torques are also absorbed by the degrees of freedom of the suspension points.

The ball-joint and floating bearing arrangement continues to compensate for parallel slippage, angular slippage and linear length errors in the X and Y directions of the opposing Z axis pairs. Such errors could occur during e.g. assembly and/or manufacture.

Moreover, a device according to the invention facilitates assembly of the system due to the fact that the support frame does not require exact alignment during assembly.

In the case of a permanent connection between the Z axis and the support frame, the connection might already be damaged and/or destroyed during assembly due to leveraging.

Furthermore, according to an embodiment of the invention, only one single pin needs to be inserted per Z axis and fixed in place with one single screw. This saves time and costs during manufacture and assembly. In so doing, the support frame becomes an easily exchangeable modular unit.

The accuracy and rigidity of the support frame can be further optimized by utilization of highly exact plates whose contour and orientation is optimally adjusted for the load.

A device according to the present invention can be implemented as a modular system design by employing just a few, independent and identical modules that can be optimally aligned. According to the present invention, geometric deviations due to thermal influences, errors in manufacture, assembly and movement in the Z direction can be simply and easily offset by a ball-joint suspension and non-locating (floating) bearing arrangement.

For the purpose of more detailed explanation, the invention is described in further detail below on the basis of preferred embodiments with reference to the drawing.

Figure 1B:
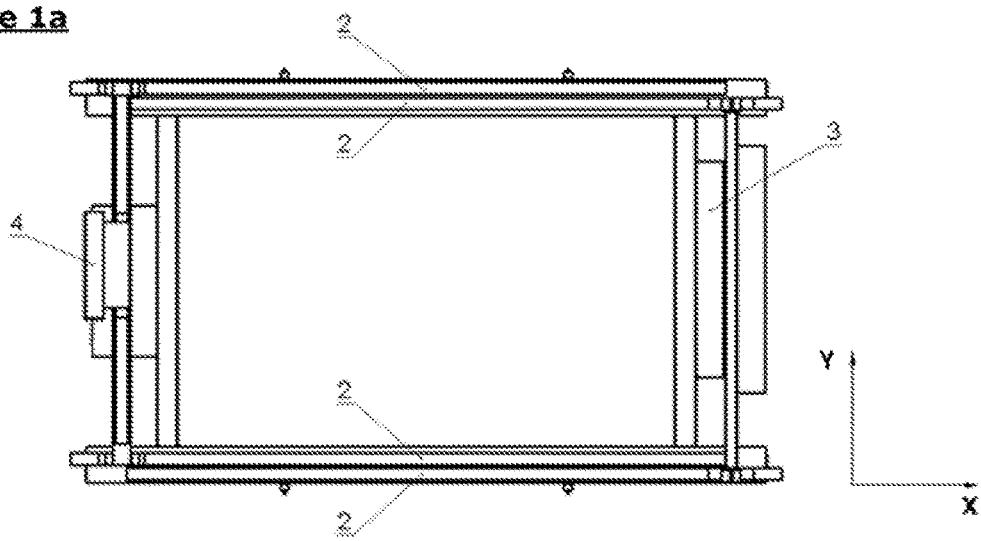
Figure 2:
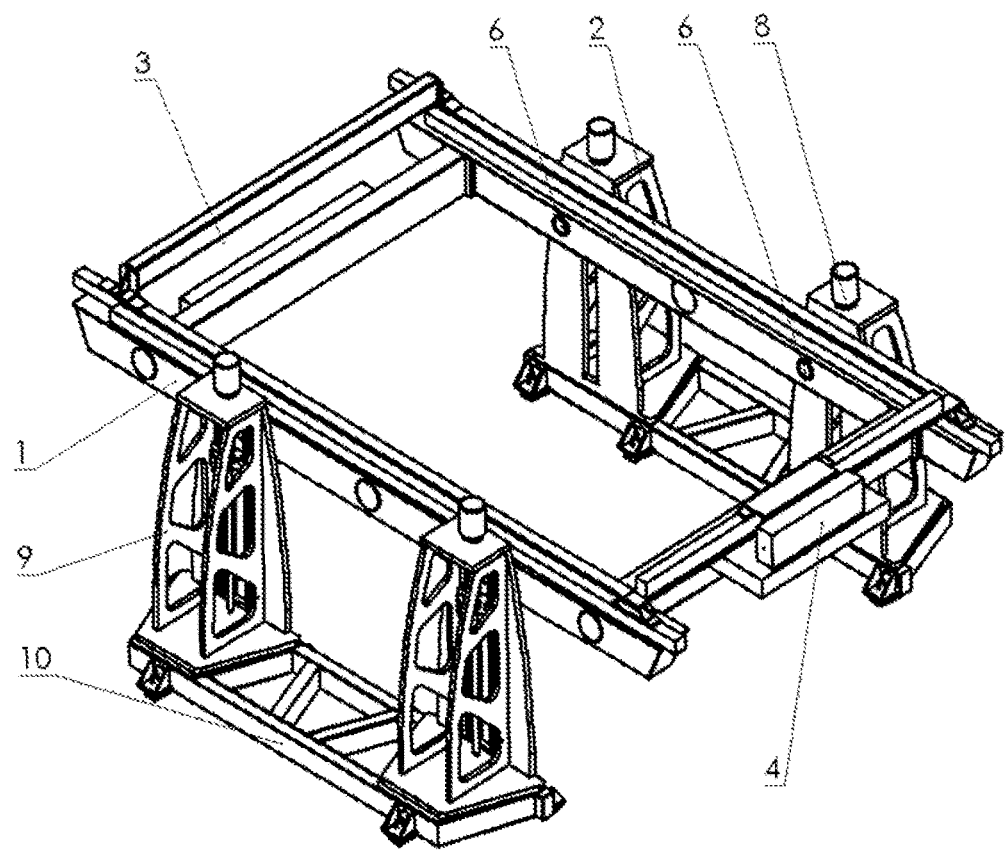
Figure 3:
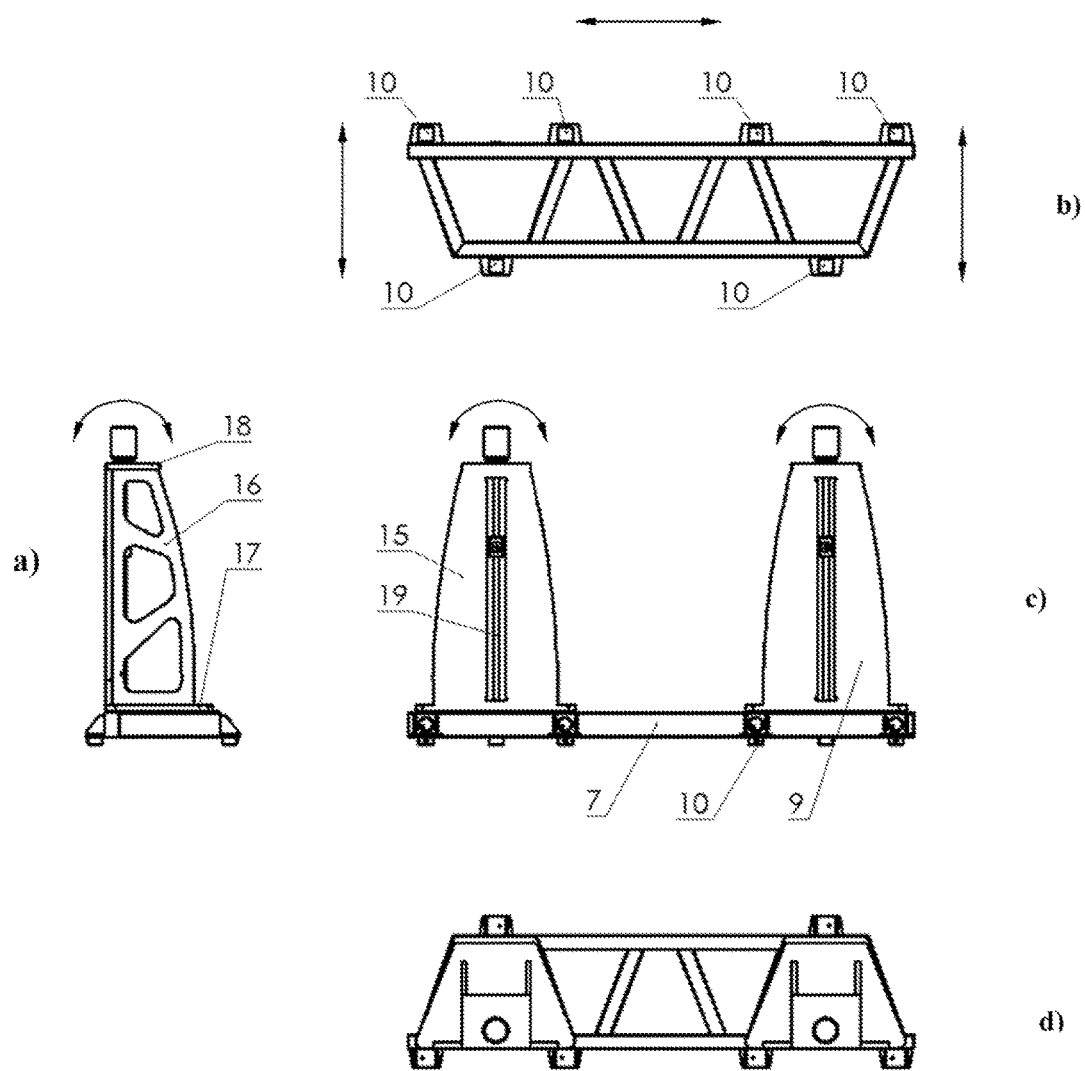
Figure 4:
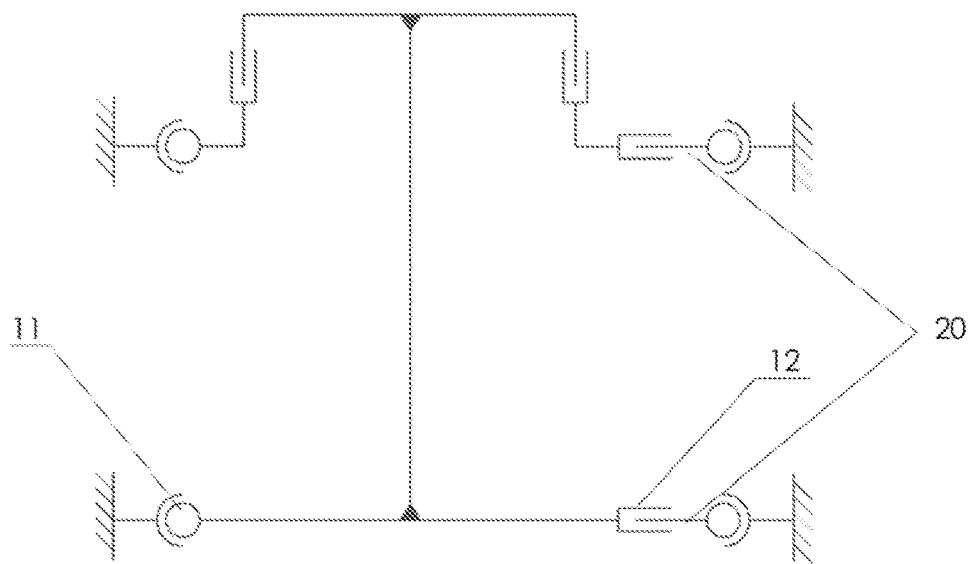
Figure 5:
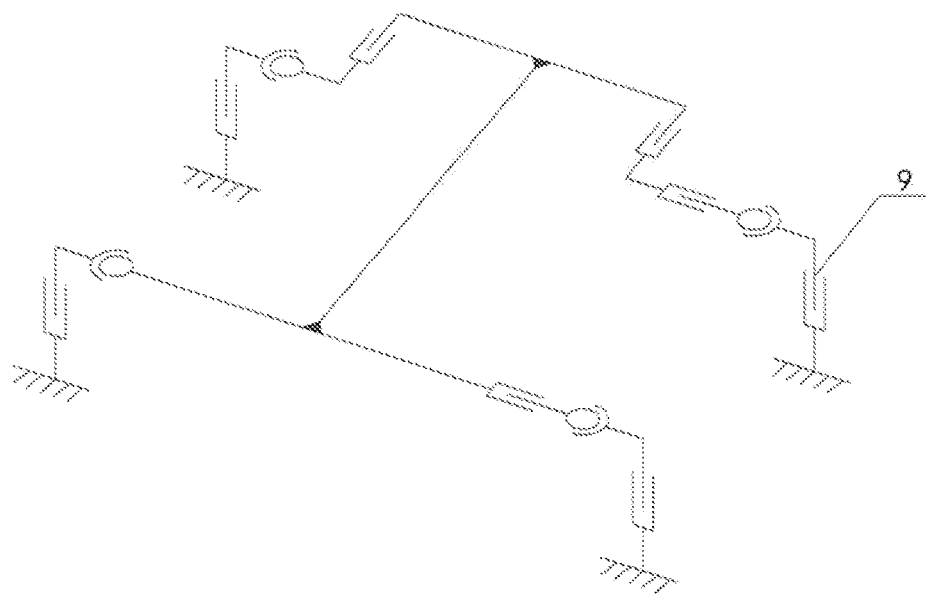
Figure 6:
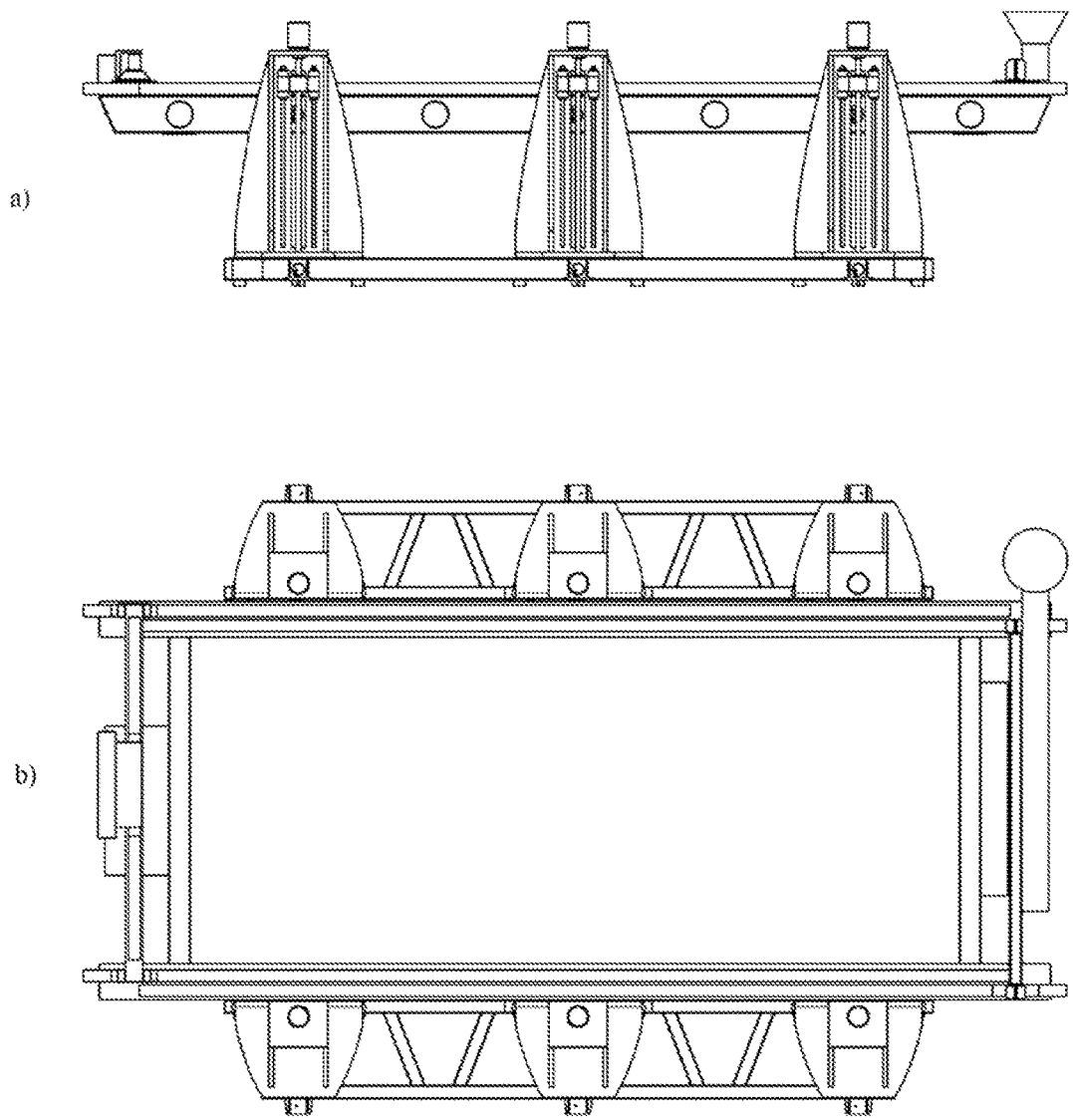
Figure 7:
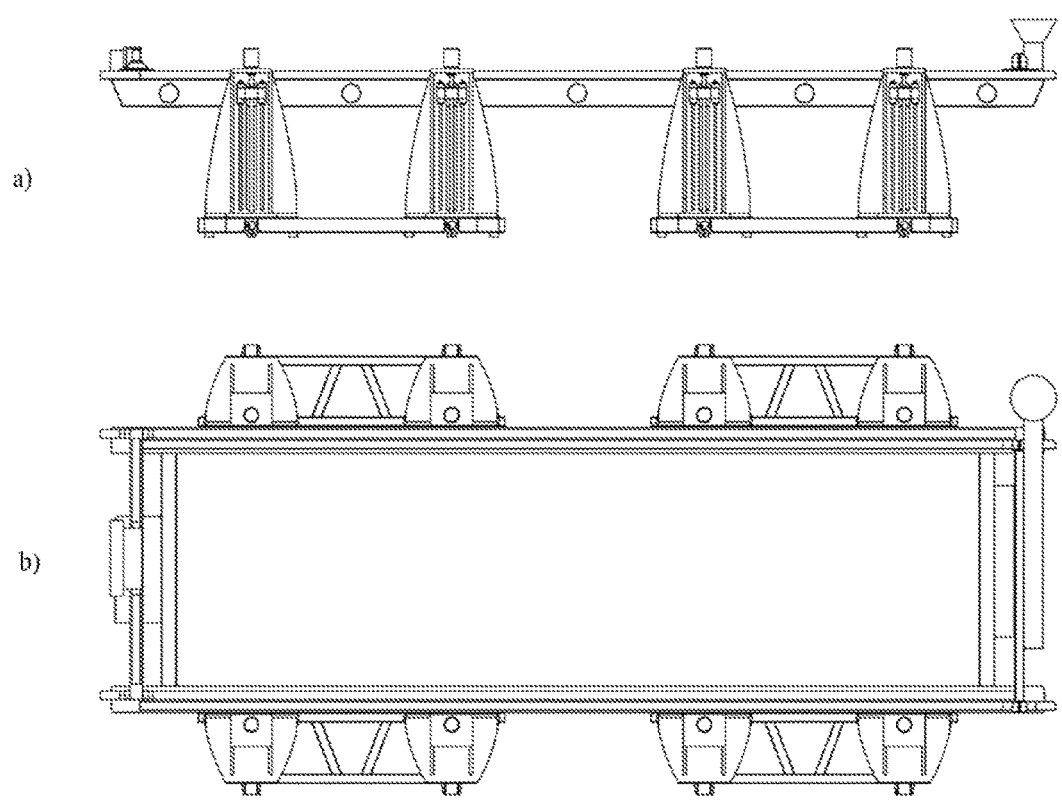

In the drawing:

FIG. 1a A side view of a support frame according to one preferred embodiment of the present invention;

FIG. 1b A top view of the support frame of FIG. 1a;

FIG. 2 a spatial representation of one preferred embodiment of the present invention;

FIGS. 3 a) to d) Various representations of the axle structures and the ground frame according to a preferred embodiment of the present invention;

FIG. 4 A model of a support frame in top view for determination of remaining degrees of freedom according to a preferred embodiment of the present invention;

FIG. 5 A model of the present invention according to a preferred embodiment represented in a spatial view for determination of remaining degrees of freedom;

FIGS. 6 a) and b) A preferred embodiment of the present invention with three vertical positioning units per respective side; and FIGS. 7 a) and b) Another preferred embodiment of the present invention with four vertical positioning units per respective side, each divided into two modules.

As can be derived from the figures, a rectangular support frame (1) is, according to an indicated preferred embodiment of the present invention relating to a device for constructing three-dimensional models, made of hollow profiles and said frame is provided to carry the positioning units in the X direction (2). These positioning units (2) move the coater (3) and the print head (4). This is represented in FIGS. 1 and 2 as examples. What is more, the support frame (1) bears all peripheral equipment for the printing process, respectively, coating with particulate material.

According to the invention, a support frame, such as that shown in FIG. 1, may have the dimensions e.g. 5 m×3 m (length X width). With all elements mounted, the frame could have a weight of e.g. 3 metric tonnes.

The support frame (1) surrounds an area, the so-called build space, in which the three-dimensional object is created. During the build process, the entire support frame (1) including the peripheral equipment must be positioned exactly in the vertical direction.

The term "peripheral equipment" hereby includes the print head (3), the coater (4) and all components required for operation.

As shown in FIGS. 1, 2 and 3, the support frame (1) is suspended at four points (two per side) located on the outer edge of the long side.

According to the displayed preferred embodiment of the invention, the suspension points (6) of the support frame (1) are situated at its Bessel points. In this way, static flexing of the support frame (1) can be kept to a minimum.

Each suspension point (6) is moved in the vertical direction by one single linear thrust unit. A vertical positioning unit consists of a linear actuator, here for example a threaded spindle and guiding element, a drive motor (8), and an axle frame (9).

So that each vertical positioning unit moves the same distance, the four drive motors (8) are coupled to one another in an electronic gantry system.

Such an assembly of the present invention achieves a modular construction. Thus, according to the displayed preferred embodiment, each vertical positioning unit can be exchanged independently of one another without a problem.

In order to achieve high accuracy while maintaining low weight, high stability and avoidance of permanent welded connections, the axle frame (9), according to the displayed preferred embodiment of the invention, is composed of flat, milled, inherently stable light metal plates.

To obtain the required accuracy, the individually machined plates are pinned and screwed.

In order to absorb the process-related forces, torsional forces and vibrations, the plates are arranged with an optimized contour and in an appropriate direction.

The machining of the individual plates is very simple due to the fact that all areas are easily accessible and allow processing in one work step. Material distortion due to welding or retrofitting work are ruled out since there is no need for extra work after the installation.

According to the displayed preferred embodiment of the invention, every axle frame structure (9) is weight and load optimized, the individual light metal plates are easily exchangeable and a subsequent trueing of the construction is dispensed with. The plate construction is thereby economical and readily available.

According to the embodiment especially as represented in FIGS. 2 and 3, an axle structure (9) consists of five flat plates.

A guidance plate (15) bears the linear thrust unit in the Z direction. It is oriented in the X direction so that an optimal, uniform state of stress is achieved if acceleration forces are exerted by the coater and print head.

The two parallel support plates (16) arranged perpendicularly to the guidance plate (15) absorb forces in the Y direction. Guidance plate (15) and support plates (16) are connected with a base plate (17). Together, they support a load-bearing plate (18) from which the guide spindle (19) hangs. The force transmission proceeds here via a spindle that hangs downward.

Alignment is obtained via two Z axle structures and/or axle frames (9) screwed in place on one side with a two-dimensional welded frame, a floor frame (7). The connection surfaces of the welded frame are processed in one work step. As a result, a good prerequisite for alignment of the vertical positioning units exists.

In turn, each assemblage formed by two vertical positioning units and/or the two axle frames (9) and a floor frame (7) result in an independent, identically manufactured, spacesaving and easily exchangeable module. Arranged opposite each other, two of these modules result in the entire Z axis of the device.

This assemblage is anchored to the floor via machine feet (10) that are adjustable in the X, Y and Z directions as depicted in FIG. 3. The highest degree of stability is thereby obtained while maintaining good adjustability.

In order to achieve complete adjustability of every single Z axis positioning unit and/or axle frame (9), the machine feet (10) are arranged in such a way under each Z axle structure that these can be optimally adjusted in the angle to the floor. In doing so, the individual machine feet are adjusted variously in the Z direction.

A slight elastic deformation of the floor frame must be accepted during alignment since the total rigidity is not changed.

Adjustability plays a major role since even the smallest manufacturing defects of the floor frame (7) will make themselves manifest as large positional deviations in the towering vertical positioning units.

If the vertical positioning units (9) do not stand adequately parallel in all directions, even after adjustment, then the Z linear thrust units and the linking of the support frame (1) will be stressed or destroyed by constraining forces, if the appropriate precautions are not taken when laying out the guiding elements.

The device is advantageously so designed that it is arranged in a statically determinate manner. This comes about due to application of the so-called Gruebler equation. This is as follows:

$$F = B \cdot (n-1-g) + \Sigma b_i + \Sigma s_i$$

whereby the individual symbols mean:
F: degree of freedom
B: mobility type (B=6 for spatial arrangements)
G: number of joints
$b_i$: mobility of joint I $s_i$: applied special dimensioning
n: number of elements If the arrangement of the support frame (1) is viewed according to the equation above without considering vertical mobility, then one can find a statically determinate arrangement according to FIG. 4. The support frame (1) is hereby a combination of four pivoting bearings, for example, the ball-joint pivoting bearings (11), each with three degrees of freedom (DOF), and the four pivots e.g. the floating bearings (12), each with two degrees of freedom fixed at the four permanent suspension points.

The total number of the existing, connected construction elements equals 6, the number of joints is 8.
The Gruebler equation then results in:

$$F = 6 \cdot (6-1-8) + (4 \cdot 3 + 4 \cdot 2) = 2$$

The two degrees of freedom relate to the rotary possibilities of the elements (20). The total arrangement is thereby statically determinate and requires no special dimensioning.

If the device is viewed in regards to the vertical positioning units, then the resulting model looks like that of FIG. 5. The vertical positioning units are thereby modelled as purely "displacement bearings" possessing a degree of freedom.
The Gruebler equation then results in:

$$F = 6 \cdot (10-1-12) + (4 \cdot 3 + 4 \cdot 2 + 4) = 4$$

The four degrees of freedom again relate to the two rotary degrees of freedom of elements (20) as well as the rotation of the support frame around the X and Y axes.

Likewise in this case, no special dimensioning is required in order to implement the arrangement as statically determinate. That means that even in the case of a malfunction of the vertical positioning units, e.g. an axle breaking out of the assemblage, the support frame still continues to be statically determinate and no constraining forces result.

According to a particularly preferred embodiment of the present invention, the implementation of the simplified model can proceed by means of connection of the support frame (1) via cylindrical bearing pins with the vertical positioning units of the Z axis system.

The ball-joint pivoting bearings (11) that receive the pins are located in the support frame (1). Furthermore on one side of the support frame, the bearing pins are loosely inserted in the Y direction within their holders in the vertical positioning unit.

Preferably, the two drillholes on the opposite side for the pivoting bearings (11) are hereby implemented in the support frame (1) as oblong-shaped holes in the X direction. The pivoting bearing (11) with the pin can move in the X direction, thus resulting in a floating bearing arrangement of the support frame in the X direction.

If the frame and/or the Z axis system expands in either the X or Y direction, then the change will be absorbed by the floating bearing arrangement. If the expansions are varying, then the pivoting bearings compensate for further angular misalignments.

The ball-joint and floating bearing arrangement continues to compensate for parallel slippage, angular slippage and linear length errors in the X and Y directions of the opposing Z axis pairs.

The cause of these errors may be attributable to assembly and manufacturing procedures.

Moreover, the assembly of the device is enormously facilitated due to the fact that the support frame (1) does not require exact spatial alignment during assembly.

In the case of a permanent connection between the vertical positioning unit (9) and the support frame (1), the connection might already be damaged and/or destroyed during assembly due to leveraging.

Furthermore, only one single pin needs to be inserted per Z axis and fixed in place with one single screw. This saves time and costs during manufacture and assembly. In so doing, the vertical positioning unit (9) becomes an easily exchangeable modular unit.

All in all, the system as described according to one preferred embodiment of the invention is characterised by a high degree of accuracy and rigidity due to the fact that precisely formed plates are used, the contour and orientation of which are optimally adjusted for the load.

A modular system design that employs just a few, independent and identical modules makes it possible to autonomously and thereby optimally perform alignment of the system. In addition, only minimal construction resources are needed to adapt the device to varying dimensioning requirements. In this context, FIG. 6 and FIG. 7 show design shapes of the device according to the invention with variously longitudinally-dimensioned build spaces. The vertical positioning units can be taken over identical in construction to the original variants. The increased weight due to the larger support frame is only taken into account in terms of the number and distribution of the individual modules.

Moreover, the production environment for such device does not place any beyond-the-normal demands insofar as the foundation since forces can be optimally transferred into the floor. This can be accomplished by a fixed connection of the Z axis with the floor via machine feet (10) that are adjustable in the X, Y and Z directions.

An advantageous feature of the present invention is that geometric deviations due to thermal influences, errors in manufacture, assembly and movement in the Z direction can be simply and easily offset by a ball-joint suspension and non-locating (floating) bearing arrangement.

DESIGNATION LIST

1 Support frame
2 Positioning units in X direction
3 Coater
4 Print head
6 Suspension points
7 Floor frame
8 Drive motor
9 Axle frame, positioning unit in Z direction
10 Machine feet
11 Pivoting bearings
12 Non-locating (floating) bearings
15 Guidance plate
16 Support plate
17 Base plate
18 Load-bearing plate
19 Guide spindle
20 Machine part with rotary degree of freedom

What is claimed is:

1. A method for assembling an apparatus for manufacturing three-dimensional models by means of a 3D printing process comprising:
arranging at least two vertical positioning units on a common substrate, wherein each vertical positioning unit has a drive direction and each vertical positioning unit has adjustable feet;
independently adjusting an angle of each of the vertical positioning units by adjusting one or more of the feet so that the drive direction of each vertical positioning unit is in a vertical direction;
attaching one of the vertical positioning units to a first side of a support frame after the step of adjusting the angle of said vertical positioning units; and
attaching a different one of the vertical positioning units to a second side of the support frame after the step of adjusting the angle of said vertical positioning units, wherein the first and second sides are opposing sides of the support frame;
wherein the support frame supports one or more material deposition units and is arranged around a build platform having a base surface for building the 3-D model; the support frame is moveable in a vertical direction by the vertical positioning units; and
the base surface of the build platform is perpendicular to the vertical direction.

2. The method of claim 1, wherein the one or more material deposition units includes a coater for depositing a particulate material.

3. The method of claim 2, wherein the one or more material deposition units includes a print head for applying a binder material.

4. The method of claim 1, wherein the at least two vertical positioning units includes a first pair of vertical positioning units and a second pair of vertical positioning units, wherein the first pair of vertical position units are placed along a first line and the second pair of vertical positioning units are placed along a second line, wherein the first line and the second line are parallel.

5. The method of claim 4, wherein three vertical positioning units including the first pair of vertical positioning units are placed along the first line and three vertical positioning units including the second pair of vertical positioning units are placed along the second line.

6. The method of claim 1, wherein each vertical positioning unit has at least three vertically adjustable feet and the step of adjusting the angle includes adjusting one or more of the feet.

7. The method of claim 1, wherein at least two of the vertical positioning units are connected by a flexibly deformable supporting structure is flexibly deformable.

8. The method of claim 1, wherein each of the vertical positioning units includes a drive motor.

9. The method of claim 8, wherein the drive motors are coupled with each other via an electronic gantry system.

10. The method of claim 1, wherein the at least two vertical positioning units includes a first pair of vertical positioning units and a second pair of vertical positioning units, wherein the first pair of vertical positioning units are positioned in spaced apart locations on a first linear track and the second pair of vertical positioning units are positioned in spaced apart locations on a second linear track.

11. The method of claim 10, wherein the first linear track is angled relative to a horizontal plane and/or the second linear track is angled relative to a horizontal plane.

12. The method of claim 1, wherein the common substrate is not flat.

13. The method of claim 1, wherein every vertical positioning unit engages with the support frame at a suspension point and is independently moveable in the vertical direction, wherein each of the suspension points is not at a corner of the support frame.

14. The method of claim 1, wherein the method includes moving one of the vertical position units in the vertical direction independently from the other vertical positioning units.

15. The method of claim 1, wherein the support frame engages with the vertical positioning units by means of bearing pins and ball-joint pivoting bearings.

16. A method for assembling an apparatus for manufacturing three-dimensional models by means of a 3D printing process comprising:
arranging at least two vertical positioning units on a common substrate, wherein each vertical positioning unit is free standing and has a vertical drive direction and each vertical positioning unit has adjustable feet;
independently adjusting an angle of each of the vertical positioning units by adjusting one or more of the feet so that the drive direction of each vertical positioning unit is in a vertical direction;
attaching one of the vertical positioning units to a first side of a support frame; and
attaching a different one of the vertical positioning units to a second side of the support frame, wherein the first and second sides are opposing sides of the support frame;
wherein the support frame supports one or more material deposition units and is arranged around a build platform having a base surface for building the 3-D model; the support frame is moveable in a vertical direction by the vertical positioning units; and
the base surface of the build platform is perpendicular to the vertical direction wherein the one or more material deposition units include a coater or a print head.

17. The method of claim 16, wherein each vertical position unit is adjusted prior to attaching to the support frame.

18. The method of claim 1, wherein the apparatus is free of any frame structure above the support frame and is free of vertical walls surrounding the build platform.

19. The method of claim 1, wherein the vertical positioning units are connected only by the support frame.

20. A method for assembling an apparatus for manufacturing three-dimensional models by means of a 3D printing process comprising:
arranging at least i) a first pair of vertical positioning units and ii) a second pair of vertical positioning units on a common substrate, wherein each vertical positioning unit has adjustable feet and has a vertical drive direction;
independently adjusting an angle of each of the vertical positioning units by adjusting one or more of the feet so that the drive direction of each vertical positioning unit is in a vertical direction;
attaching the first pair of vertical positioning units to a first side of a support frame; and
attaching the second pair of vertical positioning units to a second side of the support frame, wherein the first and second sides are opposing sides of the support frame;
wherein each vertical positioning unit is attached to a location of the support frame other than a corner of support frame supports one or more material deposition units and, the support frame is arranged around a build platform having a base surface for building the 3-D model; and the support frame is moveable in a vertical direction by the vertical positioning units wherein the one or more material deposition units include a coater or a print head.

21. A method for manufacturing three-dimensional models by means of a 3D printing process comprising steps of:
arranging at least two vertical displacement units,
wherein each vertical displacement unit has adjustable feed for independently adjusting an angle of each of the vertical displacement units so that a drive direction of each vertical displacement unit is in a vertical direction;
applying construction material in layers on a construction platform including applying a particulate material with a metering device;
wherein the metering device and a solidifying means for solidifying the particulate material are mounted to a support frame via longitudinal guides, wherein the support frame is arranged around the construction platform; and
raising the support frame with the vertical displacement units;
wherein the vertical displacement units move the support frame in a Z-direction substantially perpendicular to a base of the construction platform, the vertical displacement units are provided on the support frame;
wherein the vertical displacement units each constitute a separate part, are each independently disposable on the support frame, and are each independently adjustable in position and direction.

* * * * *

UNITED STATES PATENT AND TRADEMARK OFFICE
CERTIFICATE OF CORRECTION

PATENT NO. : 9,993,975 B2  
APPLICATION NO. : 14/855722  
DATED : June 12, 2018  
INVENTOR(S) : Hartmann et al.

Page 1 of 1

It is certified that error appears in the above-identified patent and that said Letters Patent is hereby corrected as shown below:

In the Claims

Column 10, Line 64, insert --;-- after "the vertical direction"

Column 11, Line 26-28, delete "than a corner of support frame supports one or more material deposition units and, the support frame is arranged around a build platform" and insert --than a corner of support frame, the support frame supports one or more material deposition units and is arranged around a build platform--

Column 12, Line 1, insert --;-- after "vertical positioning units"

Signed and Sealed this  
Seventh Day of August, 2018

Andrei Iancu  
*Director of the United States Patent and Trademark Office*